US011729066B2

(12) United States Patent
Ohlsson et al.

(10) Patent No.: US 11,729,066 B2
(45) Date of Patent: Aug. 15, 2023

(54) SYSTEMS AND METHODS FOR FULL HISTORY DYNAMIC NETWORK ANALYSIS

(71) Applicant: C3.ai, Inc., Redwood City, CA (US)

(72) Inventors: Henrik Ohlsson, Palo Alto, CA (US); Umashankar Sandilya, Palo Alto, CA (US); Mehdi Maasoumy Haghighi, Redwood City, CA (US)

(73) Assignee: C3.AI, Inc., Redwood City, CA (US)

( * ) Notice: Subject to any disclaimer, the term of this patent is extended or adjusted under 35 U.S.C. 154(b) by 0 days.

(21) Appl. No.: 17/245,383

(22) Filed: Apr. 30, 2021

(65) Prior Publication Data

US 2021/0359915 A1    Nov. 18, 2021

Related U.S. Application Data

(63) Continuation of application No. PCT/US2019/058951, filed on Oct. 30, 2019.

(60) Provisional application No. 62/754,786, filed on Nov. 2, 2018.

(51) Int. Cl.
*H04L 12/24* (2006.01)
*H04L 41/14* (2022.01)
*G06F 16/901* (2019.01)
*H04L 41/12* (2022.01)
*G06F 15/173* (2006.01)

(52) U.S. Cl.
CPC .......... *H04L 41/14* (2013.01); *G06F 16/9024* (2019.01); *H04L 41/12* (2013.01)

(58) Field of Classification Search
USPC ....................................................... 709/224
See application file for complete search history.

(56) References Cited

U.S. PATENT DOCUMENTS

| 6,061,609 | A | 5/2000 | Kanoi et al. |
| 8,191,002 | B2* | 5/2012 | Lauridsen ............. G06F 3/0484 709/224 |
| 9,792,434 | B1 | 10/2017 | Li et al. |
| 2004/0167903 | A1 | 8/2004 | Margolus et al. |
| 2004/0268331 | A1 | 12/2004 | Mitchell et al. |
| 2005/0041026 | A1 | 2/2005 | Haynes |
| 2007/0198679 | A1* | 8/2007 | Duyanovich ....... G06F 11/3409 709/223 |
| 2009/0100372 | A1* | 4/2009 | Lauridsen ............. G06F 16/958 715/781 |

(Continued)

FOREIGN PATENT DOCUMENTS

WO    WO-2020092637 A1    5/2020

OTHER PUBLICATIONS

EP19877797.1 Extended European Search Report dated Jun. 14, 2022.

(Continued)

*Primary Examiner* — Jude Jean Gilles
(74) *Attorney, Agent, or Firm* — Norton Rose Fulbright US LLP

(57) ABSTRACT

Provided herein are methods and systems for determining a historical state of a dynamic network. The methods may comprise continuously obtaining data associated with a system from a plurality of different data sources; constructing a full history dynamic network (FHDN) of the system using the data; and providing a state of the system for a historical time instance in response to a query of the FHDN for the historical time instance.

28 Claims, 3 Drawing Sheets

(56) References Cited

U.S. PATENT DOCUMENTS

| | | |
|---|---|---|
| 2009/0138577 A1 | 5/2009 | Casado et al. |
| 2010/0172269 A1 | 7/2010 | Hariharan |
| 2013/0066819 A1* | 3/2013 | Nice .................. G06Q 30/0255 706/14 |
| 2013/0097180 A1 | 4/2013 | Tseng |
| 2014/0075005 A1 | 3/2014 | Tung et al. |
| 2015/0051940 A1 | 2/2015 | Bhowmik et al. |
| 2015/0215245 A1* | 7/2015 | Carlson ............... G06F 3/04883 715/752 |
| 2015/0254553 A1 | 9/2015 | Arsovski |
| 2015/0339373 A1* | 11/2015 | Carlson .................. H04L 51/04 707/737 |
| 2016/0063590 A1* | 3/2016 | Subramanya ...... G06Q 30/0623 705/26.61 |
| 2016/0239336 A1 | 8/2016 | Bingham et al. |
| 2016/0350487 A1* | 12/2016 | Plunkett ................ G16H 50/20 |
| 2017/0123701 A1 | 5/2017 | Lee |
| 2017/0139961 A1 | 5/2017 | Baum et al. |
| 2017/0155557 A1 | 6/2017 | Desai et al. |
| 2018/0191867 A1 | 7/2018 | Siebel et al. |
| 2018/0300041 A1 | 10/2018 | Tilikin et al. |
| 2018/0302306 A1* | 10/2018 | Carroll ................... H04L 41/14 |

OTHER PUBLICATIONS

Li et al. Graph Convolutional Recurrent Neural Network: Data-Driven Traffic Forecasting. arXiv:1707.01926v1. Submitted on Jul. 6, 2017. Retrieved Jul. 12, 2022 at URL: https://arxiv.org/pdf/1707.01926v1. 12 pages.

PCT/US2019/058951 International Preliminary Report on Patentability dated Apr. 27, 2021.

Talukdar et al. Exact Topology Reconstruction of Radial Dynamical Systems with Applications to Distribution System of the Power Grid. arXiv:1703.00847v1. Submitted on Mar. 2, 2017. Retrieved Jul. 12, 2022 at URL: https://arxiv.org/pdf/1703.00847. 6 pages.

Mateos et al. Dynamic Network Cartography. IEEE Signal Processing Magazine, Nov. 29, 2012. Retrieved Mar. 4, 2020 from URL: https://arxiv.org/pdf/1211.6950.pdf. 21 pages.

PCT/US2019/058951 International Search Report and Written Opinion dated Feb. 7, 2020.

\* cited by examiner

T=1

T=2

T=3

T=4

T=5

T=6

SYSTEMS AND METHODS FOR FULL HISTORY DYNAMIC NETWORK ANALYSIS

CROSS-REFERENCE

This is a continuation application of International Patent Application No. PCT/US2019/058951, filed Oct. 30, 2019, which claims the benefit of U.S. Provisional Patent Application No. 62/754,786, filed on Nov. 2, 2018, both of which are hereby incorporated by reference in their entireties.

BACKGROUND

Network science is the study of large-scale and complex networks. Such networks may include computer networks, cyberphysical systems, telecommunication networks, biological networks, cognitive and semantic networks, and social networks. In such networks, distinct elements or actors can be represented by nodes (or vertices), and the connections between the elements or actors can be represented by links (or edges).

Networks can be illustrated by graphs. Several industries and companies have developed applications of network and graph processing approaches designed for static graphical analysis. For instance, Google Maps can plan complex routes over a current snapshot of the country's road networks, and Facebook can represent its social network as a large graph and has developed the GraphQL language for making queries of such graph. These graphs are not "static" in the traditional sense, because nodes and edges can be added and removed over time, and features of a node or edge may change. However, these graphs do not store the full history of the dynamic process. For example, Google Maps may be unable to illustrate the precise state of traffic at a specific time (e.g., Apr. 23, 2013, at 7:45 pm PT) and region, and Facebook may be unable to illustrate the state of one of its social network graphs, for example, at an arbitrary point from one year ago. While these networks are dynamic, the storage engine is static in that it only shows the current state of the network and previous states of the network at certain predefined time points, and they do not provide the ability to query the graph at any arbitrary time point.

SUMMARY

Current techniques for determining the historical state of a network may comprise periodically taking snapshots of a graph of the network, and then analyzing a sequence of these snapshots to understand the historical dynamic behavior. However, this may not be sufficient for different network domains. For example, for Internet-of-Things (IoT) applications such as an energy distribution system, electricity flow may be dictated by the precise physical connections of the network and understanding complex events like cascading faults may require the knowledge of the precise configuration, second by second, of switches and connectivity in the electrical network.

Provided herein are methods and systems for analyzing and understanding the full history of dynamic networks. All networks may be, at their core, dynamic objects, because edges and nodes of a network can be added, removed, or change state constantly as the network evolves. In a power grid, for instance, physical assets (electrical lines, transformers, etc) are added and removed over time, switches are opened and closed, and each of these changes fundamentally alters the resulting physical flow properties of the network. In a transportation network, for instance, roads are opened or closed, and traffic patterns on a given road change rapidly over time. In order to reason effectively about such networks, there is a need for a model that can accurately capture how a network changes over time. Additionally, there is a need for graphical analysis of a dynamic network where queries can be made about the precise state of the network at any given instant in time.

In an aspect, a computer-implemented method of determining a historical state of a dynamic network comprises continuously obtaining data associated with a system from a plurality of different data sources; constructing a full history dynamic network (FHDN) of the system using the data, wherein the FHDN comprises (1) a plurality of nodes that are capable of dynamically changing, (2) a plurality of edges connecting the nodes, the edges being capable of dynamically changing, and (3) time series associated with each of the plurality of nodes and edges; and providing a state of the system for a historical time instance in response to a query of the FHDN for said historical time instance. The time series may indicate changes in state of the plurality of nodes and the plurality of edges over time. The FHDN may be constructed without requiring periodic capturing and storing of snapshots of the system at different points in time In some embodiments, the state of the system comprises a graphical state of the entire network, in the as-operated state, at the historical time instance. In some embodiments, the state of the system comprises a graphical state for a subset of the network at the historical time instance. The graphical state of the network or the subset of the network may be an exact graphical, a substantially exact graphical state, or an approximate graphical state. In some embodiments, the FHDN is constructed without requiring periodic capturing and storing of snapshots of the network at different points in time. In some embodiments, a historical dynamic behavior of the FHDN is determined without analyzing a sequence of snapshots of the network captured at different points in time. In some embodiments, the FHDN permits the query for a historical time instance to be answered without requiring full network instantiation at said historical time instance.

In some embodiments, the plurality of nodes and edges comprises (1) all nodes and edges that had previously existed in the network at any given time instant, and (2) all nodes and edges that are presently existing in the network. In some embodiments, the time series for a selected node or edge comprises precise times of additions or removals for the selected node or edge in the network. In some embodiments, the time series are based on events or changes occurring at the selected node or edge.

In some embodiments, the state of the system at a historical time instance is obtained by using a search algorithm that iterates over the plurality of nodes and searches through the time series. In some embodiments, the search algorithm comprises an iterative graph search algorithm that is configured to only check the status of selected nodes or edges on an as-needed basis. In some embodiments, the query comprises an information request about a subset of nodes at a given time instant, and the search algorithm is configured to query the subset of nodes only and directly, without querying other unnecessary nodes.

In some embodiments, the method further comprises: utilizing a blocking technique to cache entire connected graphical regions of the FHDN in memory for any given instant in time. In some embodiments, the blocking technique comprises standard blocking, token blocking, or attribute-clustering blocking. In some embodiments, the caching of the entire connected graphical regions in memory allows searches to be carried out more quickly compared to conventional network graphing techniques.

In some embodiments, the use of the FHDN allows memory/storage savings of several orders of magnitude compared to conventional network graphing techniques. In some embodiments, the storage requirements can be reduced by at least about one three orders of magnitude compared to conventional network graphing techniques. In certain embodiments, the storage requirements can be reduced by more than three orders of magnitude or less than one order of magnitude.

In some embodiments, the system comprises an electrical distribution system. In some embodiments, the electrical distribution system comprises a plurality of distribution feeders. In some embodiments, the state of the electrical distribution system comprises graphical states of the plurality of distribution feeders at the historical time instance. In some embodiments, the state of the electrical distribution system comprises graphical states of a subset of the distribution feeders at the historical time instance. In some embodiments, the FHDN permits the query for a historical time instance to be answered without requiring full network instantiation of the electrical distribution system at said historical time instance.

In some embodiments, (1) the plurality of nodes and edges and (2) the time series are associated with the plurality of distribution feeders and the connected nodes and branches within each feeder. In some embodiments, the time series for a selected node or edge comprises precise times of additions or removals for the selected node or edge within the network. In some embodiments, the additions or removals of the selected edge corresponds to the opening or closing of a breaker switch within the electrical distribution system, wherein said breaker switch is associated with the selected edge.

In some embodiments, the query comprises a query of a precise electrical configuration of one or more selected distribution feeders at any given time instant. In some embodiments, a graph search algorithm is utilized to query the states of the one or more selected distribution feeders at any given time instant, by only searching the nodes and edges that are contained in the one or more selected distribution feeders.

In some embodiments, the graph search algorithm is configured to only query the status of nodes and edges that are contained in the selected distribution feeders on an as-needed basis. In some embodiments, the graph search algorithm is not configured to query the nodes and edges contained in other non-selected distribution feeders. In some embodiments, the network comprises 280000 grid nodes, 320000 edges, and 1000000 open/close time series events logged over a period of 6 years. In the above embodiments, the FHDN allows queries at any portion of the network at a historical time instance to be answered, while requiring only 13.4 MB of storage as compared to 2.1 TB using conventional graphing techniques. In some embodiments, the system comprises the Bill of Materials for any manufacturing company. In some embodiments, the system comprises a supply chain distribution network. In some embodiments, the system comprises a social network comprising of a plurality of users.

In another aspect, a system for determining a historical state of a dynamic network comprises: a data aggregation component for continuously obtaining data associated with a system from a plurality of different data sources; and a network graphing component configured to: construct a full history dynamic network (FHDN) of the system using the data, wherein the FHDN comprises (1) a plurality of nodes that are capable of dynamically changing, (2) a plurality of edges connecting the nodes, the edges being capable of dynamically changing, and (3) time series associated with each of the plurality of nodes and edges; and provide a state of the system for a historical time instance in response to a query of the FHDN for said historical time instance.

In another aspect, a non-transitory computer readable medium storing instructions that, when executed by one or more servers, causes the one or more servers to perform a method comprises: continuously obtaining data associated with a system from a plurality of different data sources; constructing a full history dynamic network (FHDN) of the system using the data, wherein the FHDN comprises (1) a plurality of nodes that are capable of dynamically changing, (2) a plurality of edges connecting the nodes, the edges being capable of dynamically changing, and (3) time series associated with each of the plurality of nodes and edges; and providing a state of the system for a historical time instance in response to a query of the FHDN for said historical time instance.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
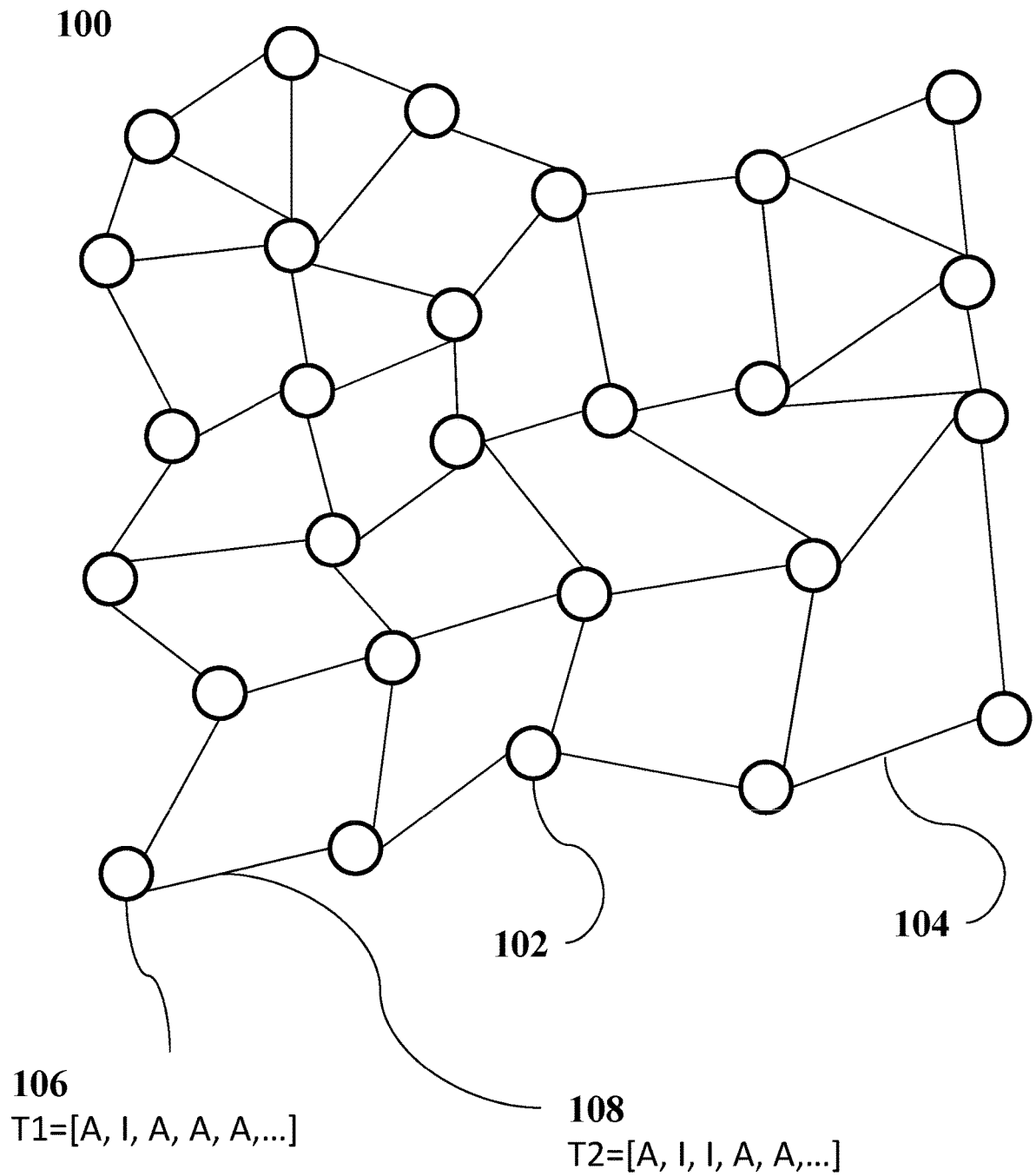
FIG. 1 shows an example of a graph of a full history dynamic network (FHDN)

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless defined otherwise, all technical and scientific terms used herein have the same meaning as is commonly understood by one of skill in the art to which the claimed subject matter belongs. It is to be understood that the foregoing general description and the following detailed description are exemplary and explanatory only and are not restrictive of any subject matter claimed. In this application, the use of the singular includes the plural unless specifically stated otherwise.

In the present description, any percentage range, ratio range, or integer range is to be understood to include the value of any integer within the recited range and, when appropriate, fractions thereof (such as one tenth and one hundredth of an integer), unless otherwise indicated. It should be understood that the terms "a" and "an" as used herein refer to "one or more" of the enumerated components unless otherwise indicated or dictated by its context. The use of the alternative (e.g., "or") should be understood to mean either one, both, or any combination thereof of the alternatives. As used herein, the terms "include" and "comprise" are used synonymously.

The term "about" or "approximately" can mean within an acceptable error range for the particular value as determined by one of ordinary skill in the art, which will depend in part on how the value is measured or determined, e.g., the limitations of the measurement system. For example, "about" can mean plus or minus 10%, per the practice in the art. Alternatively, "about" can mean a range of plus or minus 20%, plus or minus 10%, plus or minus 5%, or plus or minus 1% of a given value. Where particular values are described in the application and claims, unless otherwise stated the term "about" meaning within an acceptable error range for the particular value should be assumed. Also, where ranges and/or subranges of values are provided, the ranges and/or subranges can include the endpoints of the ranges and/or subranges.

INTRODUCTION

Provided herein is a new paradigm for storing and querying full history dynamic networks (FHDNs). The FHDNs can allow users to query the state of the network at any instant in history. By using the FHDNs, snapshots of the graph "on demand" can be reconstructed, and the full network at a given time point can be produced without storing the snapshots explicitly in a database. The FHDNs can allow users to answer queries about the graph at an instant in time without instantiating the full graph at this time. For example, a common query in an electrical distribution system is to query the precise electrical configuration of a distribution feeder at a given time. The entire network may comprise many thousands of distribution feeders, but the FHDN can allow the user to use graph search algorithms to query the state of the interested distribution feeders at any instant in time, by only searching the nodes and edges that are in the distribution feeders of interest.

The FHDN may operate by creating a graph comprising all nodes and edges that have ever existed in the network at any point in time. Each edge and node may include a time series that indicates the times of a change (e.g., additions or removals) for that node or edge in the network. A change may comprise topological changes such as addition or removal of an edge or node. In some cases, a change may also include a change in an attribute or property (e.g., weight) of an edge or node. In the case of an energy distribution system, for example, an edge may be added or removed multiple times, corresponding to a breaker switch opening or closing. To reconstruct the graph at a given time, the user can iterate over all nodes, search through time series (e.g., using binary search for nodes and edges with large numbers of events), and produce a graph that corresponds to the network at this time. Any analytic that requires search over the graph, such as finding connected components, can be run using iterative graph search algorithms that only check the status of nodes or branches on an as-needed basis. If an analytic requires information about a small subset of nodes at a given time, the FHDN data structure can be queried directly to assess the results of this analytic without processing any unnecessary nodes. Because large portions of the FHDN are small enough to store in memory, a blocking technique can be employed to cache entire connected regions of the graph in memory at any given time, allowing the user to carry out these searches quickly and occasionally only requiring loading a portion of the graph from memory.

Computer-Implemented Method

In an aspect, a computer-implemented method of determining a historical state of a dynamic network may comprise continuously obtaining data associated with a system from a plurality of different data sources; constructing a full history dynamic network (FHDN) of the system using the data; and providing a state of the system for a historical time instance in response to a query of the FHDN for the historical time instance.

The dynamic networks may be networks that vary over time. For dynamic networks, network topology may change over times. For example, nodes and/or edges may be formed and removed over time. The dynamic networks may comprise, for example, local-area networks, mobile ad hoc wireless networks, communication networks, social networks, energy distribution networks, web, and transportation networks. The dynamic networks may be driven by adversarial models, stochastic models, or game-theoretic models.

The data sources may include data from sensors or smart devices, such as appliances, smart meters, wearables, monitoring systems, data stores, customer systems, billing systems, financial systems, crowd source data, weather data, social networks, or any other sensor, enterprise system or data store. Example of smart meters or sensors may include meters or sensors located at a customer site, or meters or sensors located between customers and a generation or source location. For example, customer meters, grid sensors, or any other sensors on an electrical grid may provide measurement data or other information to the grid operator. The sensors may also comprise, but are not limited to, geophone, hydrophone, lace sensor, microphone, seismometer, sound locator, air flow meter, AFR sensors, blind spot monitor, defect detector, hall effect sensor, wheel speed sensor, airbag sensors, coolant temperature sensor, fuel level sensor, fuel pressure sensor, light sensor, MAP sensor, oxygen sensor, oil level sensor, breathalyzer, carbon dioxide sensor, carbon monoxide sensor, electrochemical gas sensor, hydrogen sensor, current sensor, daly detector, electroscope, magnetic anomaly detector, MEMS magnetic field sensor, metal detector, radio direction finder, voltage detector, actinometer, air pollution sensor, ceilometer, gas detector, humistor, leaf sensor, rain gauge, rain sensor, snow gauge, soil moisture sensor, stream gauge, tide gauge, mass flow sensor, water meter, cloud chamber, neuron detection, air speed indicator, depth gauge, magnetic compass, turn coordinator, flame detector, photodiode, wavefront sensor, barometer, pressure sensor, level sensor, viscometer, bolometer, colorimeter, thermometer, proximity sensor, reed switch, and biosensor. By incorporating data from a broad array of sources, the system may be capable of performing complex and detailed analyses, enabling greater business insights. The data sources may include sensors or databases for other industries and systems without limitation.

The data sources may include large sets of sensors, smart devices, or appliances for any type of industry. The data sources may include systems, nodes, or devices in a computing network or other systems used by an enterprise, company, customer or client, or other entity. In one embodiment, the data sources may include a database of customer or company information. The data sources may include data stored in an unstructured database or format, such as a Hadoop distributed file system (HDFS). The data sources may include data stored by a customer system, such as a customer information system (CIS), a customer relationship management (CRM) system, or a call center system. The data sources may include data stored or managed by an enterprise system, such as a billing system, financial system, supply chain management (SCM) system, asset management system, and/or workforce management system. The data sources may include data stored or managed by operational systems, such as a distributed resource management system (DRMS), document management system (DMS), content management system (CMS), energy management system (EMS), geographic information system (GIS), globalization management system (GMS), and/or supervisory control and data acquisition (SCADA) system. The data sources may include data about device events. The device events may include, for example, device failure, reboot, outage, tamper, and the like. The data sources may include social media data such as data from Facebook®, LinkedIn®, Twitter®, or another social network or social network database. The data sources may also include other external sources such as data from weather services or websites and/or data from online application program interfaces (APIs) such as those provided by Google®. The data sources may comprise an external database.

The full history dynamic network (FHDN) may comprise the entire history of a dynamic network. For instance, the FHDN may comprise the nodes, edges, and the relationship between the nodes and edges of a dynamic network at any time in the history of the dynamic network. If a dynamic network was created in the year 2010, for example, the FHDN may comprise all the edges, all the nodes, and time series that have ever existed in the dynamic network since the year 2010. Additionally, the FHDN may also comprise information on changes of all the edges and all the nodes in the dynamic network over time. The FHDN may be configured to store and query the information of a dynamic network. The FHDN may be configured to query the state of the system at any instant in history of a dynamic network.

The FHDN may comprise (1) a plurality of nodes that are capable of dynamically changing, (2) a plurality of edges connecting the nodes, the edges being capable of dynamically changing, and (3) time series associated with each of the plurality of nodes and edges.

A given node of the plurality of nodes may be a redistribution point or a communication endpoint. If the network is a physical network, the node may be an active electronic device that is attached to a network. In this situation, the node may be capable of creating, receiving, or transmitting information over a communications channel. The physical network node may be data communication equipment (DCE) such as a modem, hub, bridge or switch, or data terminal equipment (DTE) such as a digital telephone handset, a printer or a host computer. If the network is a local area network (LAN) or wide area network (WAN), every LAN or WAN node that are at least data link layer devices may a network address, typically one for each network interface controller it possesses. Examples of nodes in physical network may comprise computers, packet switches, xDSL modems (with Ethernet interface) and wireless LAN access points. If the network is the Internet or an Intranet, physical network nodes may be host computers that are identified by an IP address.

In a fixed telephone network, a node may be a public or private telephone exchange, a remote concentrator or a computer providing some intelligent network service. In cellular communication, examples of nodes may comprise switching points and databases such as the Base station controller, Home Location Register, Gateway GPRS Support Node (GGSN) and Serving GPRS Support Node (SGSN). In cable television systems (CATV), the nodes may comprise a fiber optic node. The fiber optic node may be homes or businesses within a specific geographic area that are served from a common fiber optic receiver. If the network is a distributed system, the nodes may be clients, servers or peers.

A given edge of the plurality of edges may be one of the connections between two nodes (or vertices) of the network. Edges can be directed, meaning they point from one node to another node. In this case, the two nodes connected by the directed edge may be in a one-direction relationship. The one-direction relationship may be such that one node sends information to the other node but does not receive any information from the other node. Edges can also be undirected, in which case they are bidirectional. In this case, the two nodes connected by the directed edge may be in a two-direction relationship. The two-direction relationship may be such that one node sends information to the other node, and also receives any information from the other node. In some cases, nodes may not send information to each other.

A time series may be a series of data points in time order. A time series may be a sequence taken at successive equally-spaced points in time. Time series may comprise sequence of discrete-time data. The time series may indicate when nodes or edges change, e.g., when nodes or edges are added, removed, activated, deactivated, or connected or disconnected from another node. Alternatively or additionally, the time series may indicate time-varying properties of the nodes or edges. In the case of an electrical distribution network, the nodes may be power plants, transmission substations, distribution feeders, transformers, breakers, and consumers, for example. The edges may be transmission lines and other wires that connect such nodes. The time series may indicate, for example, when a power plant is online or offline or when a breaker is open or closed. The time series may additionally indicate, for example, the power output of a power plant over time. In the case of a social network, the nodes may be businesses and people that have a profile on the social network. The edges may be the relationships between those businesses and people (e.g., friend, follower, etc.). The time series may indicate when relationships on the social network began or ended. The time series may additionally indicate, for example, how properties of the businesses or people in the social network change over time (e.g., how a person's relationship status, occupation, or location changes over time). In the case of a supply chain distribution network, the nodes may be supplier plants, assembly plants, regional distribution centers, local distribution centers, and customer locations. The nodes may be roads, railways, shipping lanes, and flight paths that connect the nodes in the supply chain network to each other. The time series may indicate, for example, whether a plant is operational at particular times and whether roads or railways are open at particular times.

The time series may represent the dynamically changing nodes and edges in the FHDN. The changing may be systematic or non-systematic. If the changing is systematic, the time series may be obtained at a systematic time interval. If the changing is non-systematic, the time series may be obtained at non-systematic time intervals. For instance, the time series may be first obtained at every 1 s for the time period of 1 minute, and then obtained every 10 s for the time period of 10 hours. In some cases, although the system may be continuously or periodically monitored for changes to nodes and edges, time series entries may only be stored in memory when actual changes to the nodes and edges occur. This can reduce the amount of memory required to store the FHDN. A query to the FHDN may comprise a request for information from the FHDN. The query may comprise requesting the state of the dynamic network at a historical time instant. The query can be posed by choosing parameters from a menu, where the database system presents a list of parameters from which the user can choose. The query can also be posed by query by example, where the system presents a blank record and lets the user specify the fields and values that define the query. The fields or values may specify the historical time instant directly, or they may specify the historical time instant indirectly. For example, the fields or values may specify a change that happens to a particular node. The query can be posed by query language, where user makes requests for information in the form of a stylized query that must be written in a special query language.

FIG. 1 shows an example of a graph of FHDN. In FIG. 1, the FHDN 100 comprises a plurality of nodes 102 that are capable of dynamically changing, a plurality of edges 104 connecting the nodes and being capable of dynamically changing, and time series associated with each of the plurality of nodes 106 and edges 108. The FHDN may comprise all the nodes and edges that have ever existed in the dynamic network. The time series 106 of one node may be T1=[A, I, A, A, A, . . . ], which represents, at a specific time interval, the changes of the node over time are "active, inactive, active, active, active, . . . ." The time series 108 of one edge may be T2=[A, I, I, A, A, . . . ], which represents, at a specific time interval, the changes of the edge over time are "active, inactive, inactive, active, active, . . . ."

Figure 2:
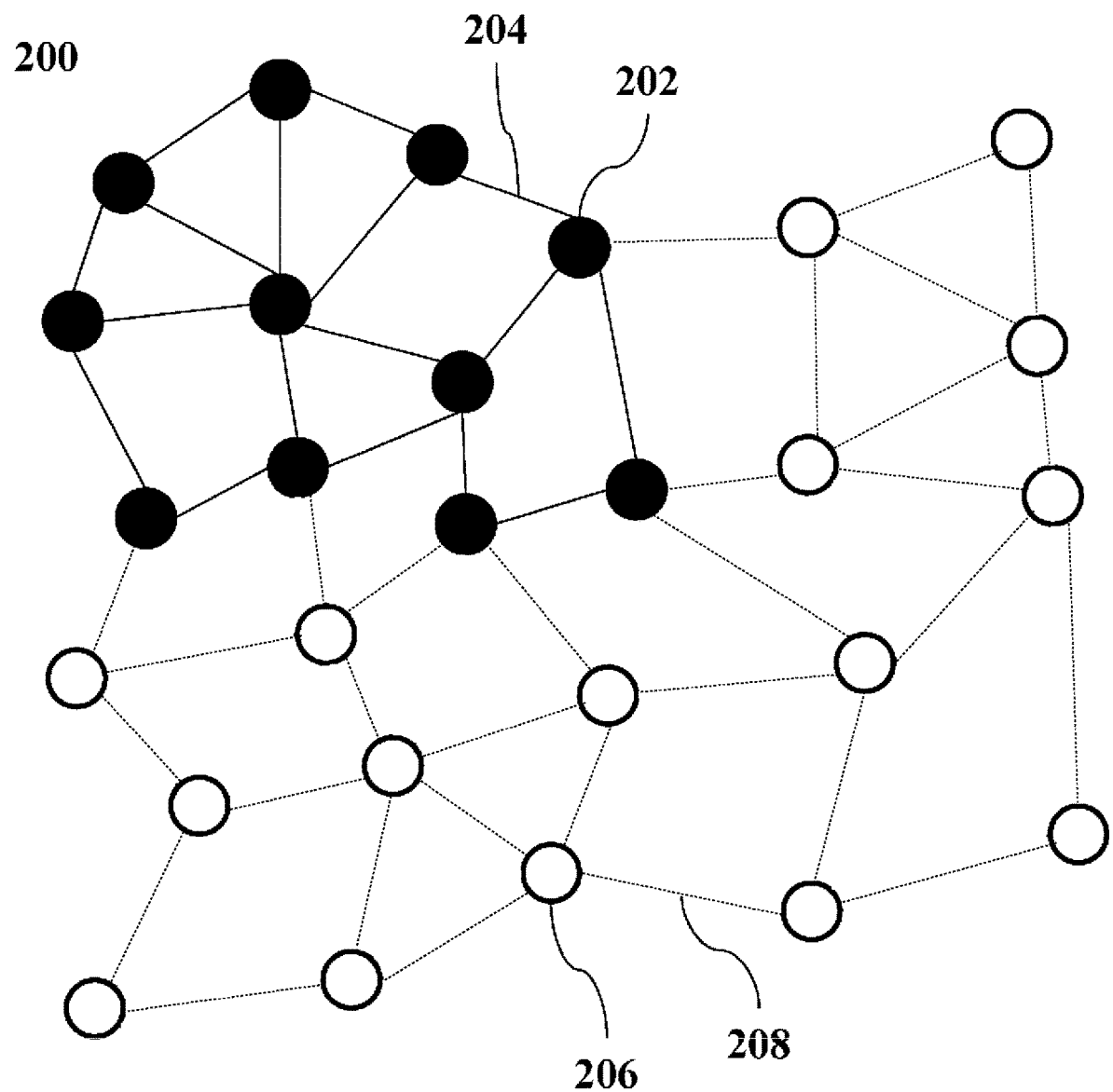
FIG. 2 shows an example of a graph of a dynamic network at time t.

FIG. 2 shows an example of a graph of dynamic network at time t. In FIG. 2, the dynamic network 200 comprises a plurality of nodes 202 that are activated at time t (shaded), and a plurality of active edges 204 (represented by solid lines) connecting the nodes that are activated at time t. At time t, the rest of the nodes 206 (unshaded) and the rest of the edges 208 (represented by dashed) are not activated.

The state of the system may comprise a graphical state of the entire network, in the as-operated state, at the historical time instance. The historical time instance may be any time in the history of the dynamic network defined by the user. For instance, the historical time instance can be a time point in the history of the dynamic network (e.g., at 10 am on Aug. 12, 2000), a time period in the history of the dynamic network (e.g., between 1 am and 12 pm on Oct. 11, 1980), or a combination thereof. A graphical state may comprise a graph structure, which may be a graphical representation of data involving relationships (edges) between nodes. A graph may be an ordered pair comprising a set of nodes together with a set of edges. Nodes may be a set together with a relation of incidence that associates with each edge connecting the two nodes.

Graphs can be used to model many types of relations and processes. For instance, in computer science, graphs may be used to represent networks of communication, data organization, computational devices, the flow of computation, etc. In one example, the link structure of a website can be represented by a directed graph, in which the nodes represent web pages and directed edges represent links from one page to another. Another example is in chemistry, where a graph may make a natural model for a molecule—nodes represent atoms and edges represent bonds. In statistical physics, graphs can represent local connections between interacting parts of a system, as well as the dynamics of a physical process on such systems. Similarly, in computational neuroscience graphs can be used to represent functional connections between brain areas that interact to give rise to various cognitive processes, where the nodes represent different areas of the brain and the edges represent the connections between those areas. Graphs may be used to represent the micro-scale channels of porous media, in which the nodes represent the pores and the edges represent the smaller channels connecting the pores. In biology, a node can represent regions where certain species exist (or inhabit) and the edges represent migration paths or movement between the regions. The graph can also be applied to problems in social media, travel, computer chip design, mapping the progression of neuro-degenerative diseases, and many other fields. In the case of travel, the systems and methods described herein can be used to create a FHDN of a travel network (e.g., roads, waterways, flight paths, etc.). Nodes may represent different destinations (e.g., cities) in the travel network, and edges may represent different paths between such destinations. The edges may be weighted by distance or travel time. Time series in the FHDN may indicate whether particular paths are open at particular times (e.g., whether particular roads are accessible or whether particular flights are available). The FHDN of the travel network can be used to determine optimal routes (e.g., routes that are quickest or shortest) from one destination to another.

In the case of computer chip design, the system and methods described herein can be used to create an FHDN of a computer chip, which can be used to analyze component failures over time and subsequently predict future failures.

In the case of neuro-degenerative diseases, the systems and methods described herein can be used to create an FHDN of a human brain. The nodes of the FHDN may represent neurons in the brain, and the edges may be connections between the neurons. The time series may indicate whether particular neurons have been adversely impacted by the disease progression. Creating FHDNs of patients' brains can aid doctors in predicting and preventing disease progression in other patients.

The systems and methods described herein can also be used to create FHDNs of oil and gas processing pipelines. An oil and gas processing pipeline may include drilling assets, refining assets, and pipeline assets (e.g., pumps, compressors, heat exchangers, and valves). The nodes in the FHDN may represent the drilling and refining assets, and the edges may represent the pipeline assets. Time series may indicate whether certain assets are operational at certain times, and they may also indicate the capacity or output of those assets over time.

A graph structure can be extended by assigning a weight to each edge of the graph. Graphs with weights, or weighted graphs, may be used to represent structures in which pairwise connections have some numerical values. For example, if a graph represents a road network, the weights could represent the length of each road. There may be several weights associated with each edge, including distance (as in the previous example), travel time, or monetary cost. A graph structure can also be extended by assigning time series to each edge and node of the graph. Graphs with time series may be used to represent structures in which pairwise connections have some values that change over time. For example, if a graph represents a road network, the time series could represent the traffic of each road over time. The weights may alternatively or additionally represent the strength of the relationships or connections between nodes.

The graphs can be stored in a computer system. The data structure used to store the graphs may depend on both the graph structure and the algorithm used for manipulating the graph. The data structure may comprise list structure, matrix structure, or a combination of both. List structures may be used for sparse graphs as they have smaller memory requirements. Matrix structures may provide faster access for some applications but can consume huge amounts of memory. Different list structure and matrix structure may comprise adjacency list, adjacency matrix, and incidence matrix. For the adjacency list, nodes may be stored as records or objects, and every vertex may store a list of adjacent vertices. This data structure may allow the storage of additional data on the nodes. For the adjacency matrix, a two-dimensional matrix may be used, in which the rows represent source nodes and columns represent destination nodes, and data on edges and nodes may be stored externally. For the incidence matrix, a two-dimensional Boolean matrix may be used, in which the rows represent the nodes and columns represent the edges, and the entries may indicate whether the vertex at a row is incident to the edge at a column. The entry may be a time series that indicates whether the vertex at a row is incident to the edge at a column at any given time instance.

The provided FHDN may be used as a graph structure for a graph database. Data objects may be stored in the graph database in the form of FHDN. A graph database may be a database that uses graph structures for queries with nodes, edges, and properties to represent and store data. In one embodiment, every element contains a direct pointer to its adjacent elements and no index lookups are necessary. A key concept of the system may be the graph (or edge or relationship), which directly relates data items in the store. The relationships may allow data in the store to be linked together directly, and in many cases retrieved with one operation. The pointers may be unidirectional or bidirectional.

Graph databases may allow simple and fast retrieval of complex hierarchical structures that are difficult to model in relational systems. The storage mechanism of graph databases may comprise a mechanism that depends on a relational engine and "store" the graph data in a table, or a mechanism that uses a key-value store or document-oriented database for storage, making them inherently NoSQL structures. Some graph databases based on non-relational storage engines may also add the concept of tags or properties, which are essentially relationships having a pointer to another document. Retrieving data from a graph database may require a query language. Some graph databases may be accessed through application programming interfaces (APIs).

Graph databases may employ a graph structure comprising nodes, edges, and properties. The graph structure may be a FHDN as described elsewhere herein. For example, a time series indicating times of change of a node or edge may be recorded with the node or edge. Nodes may represent entities such as people, businesses, accounts, or any other item to be tracked. Edges may be the lines that connect nodes to other nodes, and they may represent the relationship between them. Edges may represent an abstraction that is not directly implemented in the systems. Properties may be metadata or data about a node. For example, in the case of a social network in which people are nodes, the properties may include demographic or personal information about the people (e.g., age, sex, employer, school, location, etc.). The method disclosed herein may comprise external graph databases. External graph databases may comprise AllegroGraph, AnzoGraph, ArangoDB, DataStax, InfiniteGraph, Marklogic, Microsoft SQL server, Neo4j, OpenLink Virtuoso, Oracle Spatial and Graph, OrientDB, SAP HANA, Sparksee, Sqrrl Enterprise, Teradata Aster, or other similar types of databases.

The state of the system may comprise a graphical state for a subset of the network at the historical time instance. The graphical state may comprise all the nodes and edges that are requested by a query at the historical time instance defined by the user of the dynamic network. All the nodes and edges that are requested by a query at the historical time instance defined by the user may be a subset of the network. All the nodes and edges that are requested by a query at the historical time instance defined by the user may be the full network. The subset of the network may comprise a subset of nodes, a subset of edges, and/or a subset of time series of the full network. The subset of the network may comprise at least about 4%, 5%, 6%, 7%, 8%, 9%, 10%, 15%, 20%, 30%, 40%, 50%, 60%, 70%, 80%, 90% or greater of nodes of the full network. In other cases, the subset of the network may comprise at most about 90%, 80%, 70%, 60%, 50%, 40%, 30%, 20%, 15%, 10%, 9%, 8% or less of nodes of the full network. The subset of the network may comprise at least about 4%, 5%, 6%, 7%, 8%, 9%, 10%, 15%, 20%, 30%, 40%, 50%, 60%, 70%, 80%, 90% or greater of edges of the full network. In other cases, the subset of the network may comprise at most about 90%, 80%, 70%, 60%, 50%, 40%, 30%, 20%, 15%, 10%, 9%, 8% or less of edges of the full network. The subset of the network may comprise at least about 4%, 5%, 6%, 7%, 8%, 9%, 10%, 15%, 20%, 30%, 40%, 50%, 60%, 70%, 80%, 90% or greater of time series of the full network. In other cases, the subset of the network may comprise at most about 90%, 80%, 70%, 60%, 50%, 40%, 30%, 20%, 15%, 10%, 9%, 8% or less of time series of the full network.

The FHDN may be constructed without requiring periodic capturing and storing of snapshots of the network at different points in time.

Figure 3:
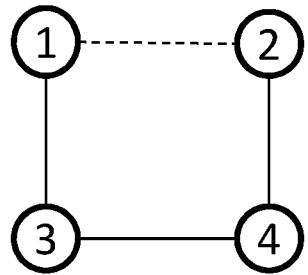
FIG. 3 shows an example of a plurality of snapshots at different times.
Figure 3:
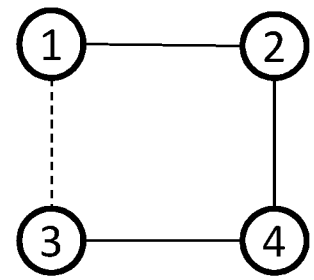
Figure 3:
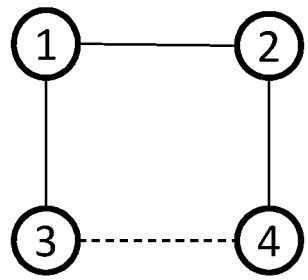
Figure 3:
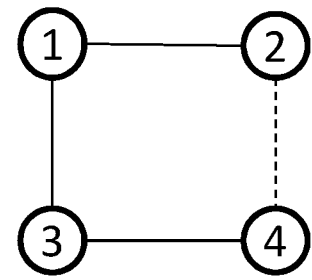
Figure 3:
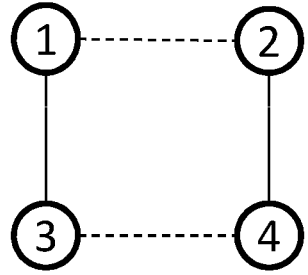
Figure 3:
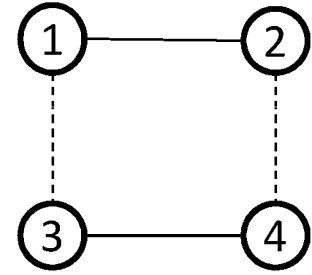

A snapshot may comprise the state of a system at a particular point in time. FIG. 3 shows an example of a plurality of snapshots of a dynamic network at different times. In FIG. 3, a time-series of snapshots of a dynamic network for time instants, t=1 to t=6 are shown. The dotted edge indicates that there is no relationship, and a solid edge indicates a relationship. For example, (1, 2) have no relationship at t=1, and (2, 4) have no relationship at t=6.

A historical dynamic behavior of the FHDN may be determined without analyzing a sequence of snapshots of the network captured at different points in time. The historical dynamic behavior may comprise the changes of the FHDN at a historical time instance defined by the user. The historical dynamic behavior may comprise the changes of the FHDN over a period of time defined by the user. To determine the historical dynamic behavior of the FHDN without analyzing a sequence of snapshots of the network captured at different points in time, time series may be obtained and used with information regarding nodes and edges in the dynamic network. In this situation, no duplication of information about nodes and edges across snapshots may be required.

The FHDN may permit the query for a historical time instance to be answered without requiring full network instantiation at the historical time instance. Instantiation may be the creation of a real instance or particular realization of an abstraction or template such as a class of objects or a computer process. To answer the query for a historical time stance without requiring full network instantiation at the historical time instance, time series may be obtained and used with information regarding nodes and edges in the dynamic network. In this situation, only the time series, nodes and edges relevant to the query may be searched and obtained, and the time series, nodes and edges irrelevant to the query need not be searched/processed. In some cases, particular time series, nodes, and edges may be inferred from other time series, nodes, and edges. For example, the state of a respective node can be inferred from nodes and edges that are adjacent to the respective node. It may be desirable to infer the state of a node when data about that node is missing, e.g., due to a malfunctioning sensor or other connection issue.

The plurality of nodes and edges may comprise (1) all nodes and edges that have previously existed in the network at a given time instant after data started being collected about the network, and (2) all nodes and edges that are presently existing in the network. In other embodiments, the plurality of nodes and edges comprises (1) all nodes and edges that had previously existed in the network at any given time instant, (2) all nodes and edges that presently exist in the network, and (3) all nodes and edges that will be existing in the network. The number of all nodes may be at least 1, 10, 50, 100, 200, 300, 400, 500, 1000, 10000, 100000, 1000000, 10000000, 100000000, 1000000000, or greater. The number of all nodes may be at most 1000000000, 100000000, 10000000, 1000000, 100000, 10000, 1000, 500, 400, 300, 200, 100, 50, 10 or less. The number of edges may be comparable to the number of nodes, or the number of edges may be greater than the number of nodes. In some cases, the number of edges may be less than the number of nodes.

The time series may be based on events or changes occurring at the selected node or edge. In some cases, the events or changes may include a topology change. Alternatively or additionally, the change may include a change in a property or attribute (e.g., weight, directionality) of an edge or node. The events or changes may comprise selecting a node, unselecting a node, selecting an edge, and unselecting an edge. The time series for a selected node or edge may comprise precise times of additions or removals for the selected node or edge in the network. The time series for a selected node or edge may comprise precise times of additions, removals, and amendments for the selected node or edge in the network. The time series may be obtained in systematic or non-systematic time intervals. The systematic time interval may be at least every 0.1 microsecond (µs), 1 µs, 10 µs, 100 µs, 1 millisecond (ms), 10 ms, 100 ms, 1 second (s), 2 s, 3 s, 10 s, 30 s, 60 s, 2 minutes (m), 3 m, 4 m, 5 m, 10 m, or greater. In some embodiments, the systematic time interval may be at most every 10 m, 5 m, 4 m, 3 m, 2 m, 1 m, 30 s, 10 s, 3 s, 2 s, 1 s, 100 ms, 10 ms, 1 ms, 100 µs, 10 µs, 1 µs, 1 µs, or less. For the non-systematic time interval, the time series may be first obtained at a first time for a first time period, and then obtained at a second time for a second time period. For instance, the time series may be first obtained at every 1 s for a first time period of 1 minute, and then obtained every 10 s for a second time period of 10 hours.

The time series may be stored in a storage, including a high-throughput, distributed key-value data store. The distributed key/value store may provide reliability and scalability with an ability to store massive volumes of datasets and operate with high reliability. The key/value store may also be optimized with tight control over tradeoffs between availability, consistency, and cost-effectiveness. The data persistence process may be designed to take advantage of elastic computer nodes and scale-out should additional processing be required to keep up with the arrival rate of messages onto the distributed queues. The storage may include a wide variety of database types. For example, distributed key-value data stores may be ideal for handling time-series and other unstructured data. The key-value data stores may be designed to handle large amounts of data across many commodity servers, may provide high availability with no single point of failure. Relational data store may be used to store and query business types with complex entity relationships. Multi-dimensional data stores may be used to store and access aggregates including aggregated data that is from a plurality of different data sources or data stores.

The state of the system at a historical time instance may be obtained by using a search algorithm that iterates over the plurality of nodes and searches through the time series. The number of the plurality of nodes may not be all the nodes that have ever existed in a dynamic network. In other cases, the number of the plurality of nodes may be all the nodes that have ever existed in a dynamic network.

The state of the system at a historical time instance may be obtained by using a search algorithm that iterates over the plurality of edges and searches through the time series. The number of the plurality of edges may not be all the edges that have ever existed in a dynamic network. In other cases, the number of the plurality of edge may be all the edges that have ever existed in a dynamic network.

The search algorithm may be any algorithm which solves the search problem to retrieve information stored within the data structure or calculated in the search space of a problem domain. Examples of search algorithms may include but are not limited to a linked list, an array data structure, or a search tree. The appropriate search algorithm may depend on the data structure being searched and prior knowledge about the data. Searching may encompass algorithms that query the data structure, such as the SQL SELECT command.

Search algorithms can comprise linear search algorithms, binary search algorithms, jump search algorithms, interpolation search algorithms, exponential search algorithms, sublist search algorithm, comparison search algorithms, and digital search algorithms. Linear search algorithms may check every record for the one associated with a target key in a linear fashion. Binary search algorithm may repeatedly target the center of the search structure and divide the search space in half. Comparison search algorithms may improve on linear searching by successively eliminating records based on comparisons of the keys until the target record is found. Comparison search algorithms can be applied on data structures with a defined order. Digital search algorithms may work based on the properties of digits in data structures that use numerical keys.

The search algorithm may comprise an iterative graph search algorithm that is configured to only check the status of selected nodes or edges on an as-needed basis. The graph search algorithms may specify an order to search through the nodes of a graph. The graph search algorithm may be, for example, a connected component search such as depth-first search or breadth-first search. For instance, the graph search algorithms may start at the source node and keep searching until the target node is found, then the frontier may comprise nodes that haven't been explored yet, and each iteration, a node may be taken off the frontier, and add its neighbors to the frontier. The as-needed basis can be set up by the users. For example, if an analytic requires information about a small subset of nodes at a given time, the FHDN data structure can be queried directly to assess the results of this analytic without touching any unnecessary nodes. The unnecessary nodes may be the nodes that are not related to the queries. The unnecessary nodes may comprise at least about: 4%, 5%, 6%, 7%, 8%, 9%, 10%, 15%, 20%, 30%, 40%, 50%, 60%, 70%, 80%, 90% or greater of all the nodes in the FHDN. In other cases, the unnecessary nodes may comprise at most about 90%, 80%, 70%, 60%, 50%, 40%, 30%, 20%, 15%, 10%, 9%, 8% or less of all the nodes in the FHDN.

The query may comprise an information request about a subset of nodes at a given time instant. The query may comprise an information request about a subset of edges at a given time instance. The query may comprise an information request about a subset of nodes and edges at a given time instance. The query may comprise an information request about a subset of nodes at multiple given time instants. The query may comprise an information request about a subset of edges at multiple given time instants. The query may comprise an information request about a subset of nodes and edges at multiple given time instants.

The search algorithm may be configured to query the subset of nodes only and directly, without querying other unnecessary nodes. This can enable quicker response times and more targeted/focused queries. In some cases, the subset of nodes/edges or nodes/edges selected to be queried for reproducing a graph may be the nodes/edges with frequent events changes. For instance, nodes or edges with the number of changes above a threshold may be queried. In another example, nodes or edges with greater number of changes are queried prior to nodes or edges with smaller number of changes. The search algorithm may be configured to query the subset of nodes only and indirectly, without querying other unnecessary nodes. The search algorithm may be configured to query the subset of nodes only and directly, without querying other unnecessary edges. The search algorithm may be configured to query the subset of nodes only and indirectly, without querying other unnecessary edges. The search algorithm may be configured to query the subset of nodes only and directly, without querying other unnecessary nodes and edges. The search algorithm may be configured to query the subset of nodes only and indirectly, without querying other unnecessary nodes and edges. The unnecessary nodes and edges may be the nodes and edges that are not related to the queries. The unnecessary nodes may comprise at least about: 4%, 5%, 6%, 7%, 8%, 9%, 10%, 15%, 20%, 30%, 40%, 50%, 60%, 70%, 80%, 90% or greater of all the nodes in the FHDN. In other cases, the unnecessary nodes may comprise at most about 90%, 80%, 70%, 60%, 50%, 40%, 30%, 20%, 15%, 10%, 9%, 8% or less of all the nodes in the FHDN. The unnecessary edges may comprise at least about: 4%, 5%, 6%, 7%, 8%, 9%, 10%, 15%, 20%, 30%, 40%, 50%, 60%, 70%, 80%, 90% or greater of all the edges in the FHDN. In other cases, the unnecessary edges may comprise at most about 90%, 80%, 70%, 60%, 50%, 40%, 30%, 20%, 15%, 10%, 9%, 8% or less of all the edges in the FHDN.

The method may further comprise utilizing a blocking technique to cache one or more connected graphical regions of the FHDN in memory for any given instant in time. The memory may be volatile RAM or non-volatile memory. Volatile RAM may be implemented as dynamic RAM (DRAM), which requires power continually in order to refresh or maintain the data in the memory. Non-volatile memory may be a magnetic hard drive, a magnetic optical drive, an optical drive (e.g., a DVD RAM), or other type of memory system that maintains data even after power is removed from the system. The non-volatile memory may also be a random-access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

The blocking technique may comprise standard blocking, token blocking, or attribute-clustering blocking. The blocking technique may help avoid memory bandwidth bottlenecks in a number of applications. The blocking technique may exploit the inherent data reuse available in the application by ensuring that data remains in cache across multiple uses. The blocking technique can be performed on 1-D, 2-D or 3-D spatial data structures. Some iterative applications can further benefit from blocking over multiple iterations to further mitigate bandwidth bottlenecks. The blocking technique may comprise a combination of loop splitting and interchange. Cache blocking may be a technique to rearrange data access to pull subsets (blocks) of data into cache and to operate on this block to avoid having to repeatedly fetch data from main memory.

The caching of one or more connected graphical regions in memory may allow searches to be carried out more quickly compared to conventional network graphing techniques. A connected graphical region may refer to a connected region of a graph which contains no unreachable vertices/nodes. For instance, a connected region of a graph may be loaded into cache and remained across multiple uses. The caching of the one or more connected graphical regions in memory may allow searches to be carried out 5-65 times faster, or more, compared to conventional network graphing techniques.

The use of the FHDN may allow memory/storage savings of several orders of magnitude compared to conventional network graphing techniques. The storage requirements can be reduced by at least three orders of magnitude compared to conventional network graphing techniques. The storage requirements can be reduced by from 1 to 10, 2 to 9, 3 to 8, 4 to 7, 5 to 6 orders of magnitude compared to conventional network graphing techniques. The storage requirements can be reduced by at least 3, 4, 5, 6, 7, 8, 9, 10 or more orders of magnitude compared to conventional network graphing techniques. In some cases, the storage requirements can be reduced by at least 10, 9, 8, 7, 6, 5, 4 or less orders of magnitude compared to conventional network graphing techniques.

Electrical Distribution System

The system may comprise an electrical distribution system. The electrical distribution system may comprise different arrangements. The arrangements may comprise a radial system, an expanded radial system, a radial system with primary selectivity, a primary and secondary simple radial system, a primary loop system, a secondary selective system, a primary selective system, a sparing transformer system, a secondary spot network, and a composite system.

The electrical distribution system may comprise a plurality of distribution feeders. The plurality of distribution feeders may be connected to each other through a plurality of connections. The distribution feeders may comprise a plurality of nodes. The nodes may comprise an electrical consumption device and an electrical grid. The distribution feeders may comprise a plurality of edges. The edges may comprise electrical wires connecting the nodes.

The state of the electrical distribution system may comprise graphical states of the plurality of distribution feeders at the historical time instance. The state of the electrical distribution system may comprise graphical states of the plurality of connections connecting distribution feeders at the historical time instance.

The state of the electrical distribution system may comprise graphical states of a subset of the distribution feeders at the historical time instance. The graphical state may comprise all the distribution feeders that are requested by a query at the historical time instance. All the distribution feeders at the historical time instance may be a subset of the electrical distribution system. The subset of the distribution feeders may comprise at least about: 4%, 5%, 6%, 7%, 8%, 9%, 10%, 15%, 20%, 30%, 40%, 50%, 60%, 70%, 80%, 90% or greater of distribution feeders of the electricity distribution system. In other cases, the subset of the distribution feeders may comprise at most about 90%, 80%, 70%, 60%, 50%, 40%, 30%, 20%, 15%, 10%, 9%, 8% or less of the distribution feeders of the electricity distribution system.

The FHDN may permit the query for a historical time instance to be answered without requiring full network instantiation of the electrical distribution system at the historical time instance. Instantiation may be the creation of a real instance or particular realization of an abstraction or template such as a class of data objects or a computer process.

The plurality of nodes and edges and the time series may be associated with the plurality of distribution feeders and the connected nodes and branches within each feeder. The plurality of nodes and edges may comprise (1) all nodes and edges that had previously existed in the distribution feeders at any given time instant, and (2) all nodes and edges that are presently existing in the distribution feeders. In other embodiments, the plurality of nodes and edges comprises (1) all nodes and edges that had previously existed in the distribution feeders at any given time instant, (2) all nodes and edges that are presently existing in the distribution feeders, and (3) all nodes and edges that will be existing in the distribution feeders.

The time series may comprise precise times of additions or removals for the selected node or edge in the distribution feeders. The time series may comprise precise times of additions, removals, or amendments for the selected node or edge in the distribution feeders. The time series may be obtained through systematic or non-systematic time intervals. For the non-systematic time interval, the time series may be first obtained at a first time for a first time period, and then obtained at a second time for a second time period. For instance, the time series may be first obtained at every 1 s for a first time period of 1 minute, and then obtained every 10 s for a second time period of 10 hours. The additions or removals of the selected edge may correspond to the opening or closing of a breaker switch within the electrical distribution system, wherein the breaker switch is associated with the selected edge. The amendments of the selected edges may represent the changes of electrical consumption of the selected edges.

The query may comprise a query of a precise electrical configuration of one or more selected distribution feeders at any given time instant.

The graph search algorithm may be utilized to query the states of the one or more selected distribution feeders at any given time instant, by only searching the nodes and edges that are contained in the one or more selected distribution feeders. The search algorithm may be any algorithm which solves the search problem to retrieve information stored within some data structure or calculated in the search space of a problem domain. Examples of search algorithms include, but are not limited to, a linked list, an array data structure, or a search tree. Search algorithms can also comprise linear search algorithms, binary search algorithms, jump search algorithms, interpolation search algorithms, exponential search algorithms, sublist search algorithm, comparison search algorithms, and digital search algorithms.

The graph search algorithm may not be configured to query the nodes and edges contained in other non-selected distribution feeders. The search algorithm may be configured to query the subset of nodes only and directly, without querying other unnecessary nodes. The search algorithm may be configured to query the subset of nodes only and indirectly, without querying other unnecessary nodes. The search algorithm may be configured to query the subset of nodes only and directly, without querying other unnecessary edges. The search algorithm may be configured to query the subset of nodes only and indirectly, without querying other unnecessary edges. The search algorithm may be configured to query the subset of nodes only and directly, without querying other unnecessary nodes and edges. The search algorithm may be configured to query the subset of nodes only and indirectly, without querying other unnecessary nodes and edges. The unnecessary nodes and edges may be the nodes and edges that are not related to the queries.

The FHDN may allow queries at any portion of the network at a historical time instance to be answered, while using only about 10 MB to 100 MB of storage compared to 2.1 TB using conventional graphing techniques. The amount of memory required to store the FHDN may be at most 40 MB, 30 MB, 25 MB, 20 MB, 19 MB, 18 MB, 17 MB, 16 MB, 15 MB, 14 MB, 13.4 MB, 13 MB, 12 MB, 11 MB, 10 MB, 9 MB, 8 MB, 7 MB, 6 MB, 5 MB, 4 MB, 3 MB, 2 MB, 1 MB or less. In some cases, the amount of memory required to store the FHDN may be much greater depending on the size, complexity, and age of the system that the FHDN represents.

Bill of Materials

The system may comprise the Bill of Materials for any manufacturing company. The bill of materials (BOM) may comprise a list of the raw materials, sub-assemblies, intermediate assemblies, sub-components, parts, and the quantities of each needed to manufacture an end product. A BOM may be used for communication between manufacturing partners or confined to a single manufacturing plant.

A BOM can define products as they are designed (engineering bill of materials), as they are ordered (sales bill of materials), as they are built (manufacturing bill of materials), or as they are maintained (service bill of materials). The different types of BOMs depend on the business need and use for which they are intended. The BOM may also comprise the formula, recipe, or ingredients list. In electronics, the BOM may represent the list of components used on the printed wiring board or printed circuit board.

The system may comprise a supply chain distribution network. The supply chain distribution network may comprise a plurality of players (e.g. buyers or sellers). The plurality of players may be connected to each other through a plurality of connections. The connections may represent buying, selling, or buying and selling.

The state of the supply chain distribution network may comprise graphical states of the plurality of players at the historical time instance. The state of the supply chain distribution network may comprise graphical states of the plurality of connections connecting players at the historical time instance.

The state of the supply chain distribution network may comprise graphical states of a subset of the players at the historical time instance. The graphical state may comprise all the players that are active in the supply chain distribution network at the historical time instance. All the players at the historical time instance may be a subset of the system. The subset of the players may comprise at least about: 4%, 5%, 6%, 7%, 8%, 9%, 10%, 15%, 20%, 30%, 40%, 50%, 60%, 70%, 80%, 90% or greater of players of the supply chain distribution network. In other cases, the subset of the players may comprise at most about 90%, 80%, 70%, 60%, 50%, 40%, 30%, 20%, 15%, 10%, 9%, 8% or less of the players of the supply chain distribution network.

The FHDN may the query for a historical time instance to be answered without requiring full network instantiation of the supply chain distribution network at the historical time instance. In the supply chain distribution network, the FHDN may comprise a plurality of players (represented by a plurality of nodes), a plurality of connections connecting the players (represented by a plurality of edges), and time series associated with each of the plurality of players and connections. The FHDN of the supply chain distribution system may comprise all the players and all the connections that have ever existed in the supply chain distribution system.

The plurality of nodes and edges and the time series may be associated with the plurality of players. The plurality of nodes and edges may comprise (1) all nodes and edges that had previously existed in the supply chain distribution system at any given time instant, and (2) all nodes and edges that are presently existing in the supply chain distribution system. In other embodiments, the plurality of nodes and edges comprises (1) all nodes and edges that had previously existed in the supply chain distribution system at any given time instant, (2) all nodes and edges that are presently existing in the supply chain distribution system, and (3) all nodes and edges that will be existing in the supply chain distribution system The time series may comprise precise times of additions or removals for the selected node or edge in the supply chain distribution system. The time series may comprise precise times of additions, removals, or amendments for the selected node or edge in the supply chain distribution system. In the supply chain distribution system, the additions may represent a player is open to buy or sell from other players, the removals may represent a player is not open to buy or sell from other players, the amendments may represent a player changes his/her positions in buying or selling from other players. The time series may be obtained through systematic or non-systematic time intervals. For the non-systematic time intervals, the time series may be first obtained at a first time for a first time period, and then obtained at a second time for a second time period. For instance, the time series may be first obtained at every 1 s for a first time period of 1 minute, and then obtained every 10 s for a second time period of 10 hours.

The graph search algorithm may be utilized to query the states of the supply chain distribution network at a given time instant, by only searching the nodes and edges that are active in the supply chain distribution network. The graph search algorithms may specify an order to search through the nodes of a graph. The graph search algorithm may be, for example, a connected component search such as a depth-first search or breadth-first search. For instance, the graph search algorithms may start at the source node and keep searching until the target node is found, then the frontier may comprise nodes that haven't been explored yet, and each iteration, a node may be taken off the frontier, and add its neighbors to the frontier. The as-needed basis can be set up by the users. For example, if an analytic requires information about a small subset of nodes at a given time, the FHDN data structure can be queried directly to assess the results of this analytic without touching any unnecessary nodes. The search algorithm may be any algorithm which solves the search problem to retrieve information stored within some data structure or calculated in the search space of a problem domain. Examples search algorithms are described elsewhere herein. The graph search algorithms may specify an order to search through the nodes of a graph. The graph search algorithm may be a depth-first search algorithm, a breadth-first search algorithm, Dijkstra's Algorithm, or the like.

The graph search algorithm may not be configured to query the non-selected nodes and edges contained in the supply chain distribution network. The search algorithm may be configured to query the subset of nodes and/or edges only and directly, without querying other unnecessary nodes and/or edges. The search algorithm may be configured to query the subset of nodes and/or edges only and indirectly, without querying other unnecessary nodes and/or edges. The unnecessary nodes or edges may comprise at least about: 4%, 5%, 6%, 7%, 8%, 9%, 10%, 15%, 20%, 30%, 40%, 50%, 60%, 70%, 80%, 90% or greater of all the nodes or edges, respectively, in the FHDN. In other cases, the unnecessary nodes or edges may comprise at most about 90%, 80%, 70%, 60%, 50%, 40%, 30%, 20%, 15%, 10%, 9%, 8% or less of all the nodes or edges, respectively, in the FHDN.

The FHDN may allow queries at any portion of the supply chain distribution network at a historical time instance to be answered, while requiring only small storage. The amount of memory required to store the FHDN may be at most 40 MB, 30 MB, 25 MB, 20 MB, 19 MB, 18 MB, 17 MB, 16 MB, 15 MB, 14 MB, 13.4 MB, 13 MB, 12 MB, 11 MB, 10 MB, 9 MB, 8 MB, 7 MB, 6 MB, 5 MB, 4 MB, 3 MB, 2 MB, 1 MB or less. In some cases, the amount of memory required to store the FHDN may be much greater depending on the size, complexity, and age of the system that the FHDN represents.

Social Network

The system may comprise a social network comprising of a plurality of users. The system may comprise a plurality of social networks. The plurality of social networks may be connected to each other through a plurality of connections. A given social network of the plurality of social networks may comprise a plurality of users (represented by nodes) and a plurality of connections (represented by edges).

The systems described herein can be used to query the state of social network at particular times in history. Such states can be used to track demographic changes in the population of people on the social network, for example. Such states may also be of interest to users of social networks so that such users can see how their social circles have grown over time. The state of the system may comprise graphical states of the plurality of social networks at the historical time instance. The state of the system may comprise graphical states of the plurality of connections connecting social networks at the historical time instance. The number of social networks at the historical time may be at least 1, 10, 50, 100, 200, 300, 400, 500, 1000, 10000 or greater. The number of social networks at the historical time may be at most 10000, 1000, 500, 400, 300, 200, 100, 50, 10 or less. The number of connections connecting social networks at the historical time instance may be at least 1, 10, 50, 100, 200, 300, 400, 500, 1000, 10000 or greater. The number of connections connecting social networks at the historical time instance may be at most 10000, 1000, 500, 400, 300, 200, 100, 50, 10 or less.

The state of the system may comprise graphical states of a subset of the social networks at the historical time instance. The graphical state may comprise all the social networks that are active at the historical time instance. All the social networks at the historical time instance may be a subset of the system. The subset of the social networks may comprise at least about: 4%, 5%, 6%, 7%, 8%, 9%, 10%, 15%, 20%, 30%, 40%, 50%, 60%, 70%, 80%, 90% or greater of full social networks of the system. In other cases, the subset of the social networks may comprise at most about 90%, 80%, 70%, 60%, 50%, 40%, 30%, 20%, 15%, 10%, 9%, 8% or less of the full social networks of the system.

The FHDN may permit the query for a historical time instance to be answered without requiring full network instantiation of the system at the historical time instance. In the system, the FHDN may comprise a plurality of users (represented by a plurality of nodes), a plurality of connections connecting the users (represented by a plurality of edges), and time series associated with each of the plurality of users and connections. The connections may represent following or adding a friend. The FHDN of the social network may comprise all the users and all the connections that have ever existed in the system.

The plurality of nodes and edges and the time series may be associated with the plurality of social networks and the connected nodes and branches within each social network. The plurality of nodes and edges may comprise (1) all nodes and edges that had previously existed in the social networks at any given time instant, and (2) all nodes and edges that are presently existing in the social networks. In other embodiments, the of nodes and edges may comprise (1) all nodes and edges that had previously existed in the social networks at any given time instant, (2) all nodes and edges that are presently existing in the social networks, and (3) all nodes and edges that will be existing in the social networks.

The time series may comprise precise times of additions or removals for the selected node or edge in the social networks. The time series may comprise precise times of additions, removals, or amendments for the selected node or edge in the social network. In the social networks, the additions may represent a user is adding another user as a friend or following another user, the removals may represent a user is blocking or unfriending another user, and the amendments may represent a user changes his/her positions towards another user. For the systematic time intervals, the time series may be first obtained at a first time for a first time period, and then obtained at a second time for a second time period. For instance, the time series may be first obtained at every 1 s for a first time period of 1 minute, and then obtained every 10 s for a second time period of 10 hours.

The graph search algorithm may be utilized to query the states of the social networks at any given time instant, by only searching the nodes and edges that are contained in the interested social networks. The search algorithm may be any algorithm which solves the search problem to retrieve information stored within some data structure or calculated in the search space of a problem domain. Examples search algorithms are described elsewhere herein.

The graph search algorithm may be configured to only query the status of nodes and edges that are contained in the selected social networks on an as-needed basis. The graph search algorithm may not be configured to query the nodes and edges contained in other non-selected social networks. The search algorithm may be configured to query the subset of nodes and/or edges only and directly, without querying other unnecessary nodes and/or edges. In other embodiments, the search algorithm may be configured to query the subset of nodes and/or edges only and indirectly, without querying other unnecessary nodes and/or edges. The unnecessary nodes or edges may comprise at least about: 4%, 5%, 6%, 7%, 8%, 9%, 10%, 15%, 20%, 30%, 40%, 50%, 60%, 70%, 80%, 90% or greater of all the nodes and edges, respectively, in the FHDN. In other cases, the unnecessary nodes or edges may comprise at most about 90%, 80%, 70%, 60%, 50%, 40%, 30%, 20%, 15%, 10%, 9%, 8% or less of all the nodes and edges, respectively, in the FHDN.

The amount of memory required to store the FHDN may be at most 40 MB, 30 MB, 25 MB, 20 MB, 19 MB, 18 MB, 17 MB, 16 MB, 15 MB, 14 MB, 13.4 MB, 13 MB, 12 MB, 11 MB, 10 MB, 9 MB, 8 MB, 7 MB, 6 MB, 5 MB, 4 MB, 3 MB, 2 MB, 1 MB or less. In some cases, the amount of memory required to store the FHDN may be much greater depending on the size, complexity, and age of the system that the FHDN represents.

OTHER EMBODIMENTS

In another aspect, a system for determining a historical state of a dynamic network may comprise a data aggregation component and a network graphing component.

The data aggregation component may be configured to continuously obtain data associated with a system from a plurality of different data sources. The data sources are explained elsewhere herein. The data aggregation component may perform data aggregation. The data aggregation may comprise graph aggregation. In graph aggregation, the temporal variation in the topology and parameter values can be represented using aggregates as edge/node attributes in the graph used to represent the spatial network. The edges and nodes can disappear from the network during certain instants of time and new nodes and edges can be added. The time aggregated graph can keep track of these changes through a time series attached to each node and edge that indicates their presence at various instants of time.

The network graphing component may be configured to construct a full history dynamic network (FHDN) of the system using the data and provide a state of the system for a historical time instance in response to a query of the FHDN for the historical time instance. The FHDN may comprise (1) a plurality of nodes that are capable of dynamically changing, (2) a plurality of edges connecting the nodes, the edges being capable of dynamically changing, and (3) time series associated with each of the plurality of nodes and edges. The FHDN is described elsewhere herein.

The system may further comprise a display component. The display component may comprise a speaker or a display screen. The speaker and/or display screen may be operatively coupled with an electronic device. The speaker and/or display screen may be integrated with an electronic device. The electronic device may be a small alert apparatus. The electronic device may be a portable electronic device. The electronic device may be mobile phones, PCs, tablets, printers, consumer electronics, and appliances. The electronic devices may be wearable devices, including but not limited to, Fitbit, Apple watch, Samsung health, Misfit, Xiaomi Mi band, and Microsoft band. The display screen may be a liquid crystal display, similar to a tablet computer. The display screen may be accompanied by one or more speakers and may be configured to provide visual and audial instructions to a user. The speaker may comprise smart speakers. The smart speakers may comprise Alexa, Google Home, Google Assistant, Clova, Microsoft Cortana, AliGenie, Ambient, Apple HomeKit, Apple Siri, and Apple Pod.

In another aspect, a non-transitory computer readable medium may store instructions that, when executed by one or more servers, causes the one or more servers to perform a method comprising continuously obtaining data associated with a system from a plurality of different data sources; constructing a full history dynamic network (FHDN) of the system using the data; and providing a state of the system for a historical time instance in response to a query of the FHDN for the historical time instance.

The data may be stored in a database. A database can be stored in computer readable format. A computer processor may be configured to access the data stored in the computer readable memory. A computer system may be used to analyze the data to obtain a result. The result may be stored remotely or internally on the non-transitory computer readable medium and communicated to users of the system or FHDN. The non-transitory computer readable medium may be operatively coupled with components for transmitting the result. Components for transmitting can include wired and wireless components. Examples of wired communication components can include a Universal Serial Bus (USB) connection, a coaxial cable connection, an Ethernet cable such as a Cat5 or Cat6 cable, a fiber optic cable, or a telephone line. Examples for wireless communication components can include a Wi-Fi receiver, a component for accessing a mobile data standard such as a 3G or 4G LTE data signal, or a Bluetooth receiver. All these data in the non-transitory computer readable medium may be collected and archived to build a data warehouse.

The FHDN may comprise (1) a plurality of nodes that are capable of dynamically changing, (2) a plurality of edges connecting the nodes, the edges being capable of dynamically changing, and (3) time series associated with each of the plurality of nodes and edges. The FHDN is described elsewhere herein.

The systems and methods described herein can be implemented, for example using various embodiments of the platform described in U.S. Patent Application Publication No. 2018/0191867 (entitled "Systems, Methods, and Devices for an Enterprise AI and Internet-of-Things Platform) which is herein incorporated by reference in its entirety.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method of determining a historical state of a system, the method comprising:
    obtaining data about the system from a plurality of different data sources over a period of time;
    constructing, by a network graphing component, a full history dynamic network (FHDN) using the data, wherein the FHDN comprises a graph representing the system over the period of time, wherein the graph comprises:
        (1) a plurality of nodes that represent elements of the system during the period of time, wherein the plurality of nodes are capable of dynamically changing over the period of time;
        (2) a plurality of edges connecting the nodes, wherein each edge of the plurality of edges represents a relationship between a pair of nodes over the period of time, and wherein the plurality of edges are capable of dynamically changing over the period of time;
        (3) first time series associated with each of the plurality of nodes; and
        (4) second time series data associated with each of the plurality of edges,
        wherein the first time series indicate changes in state of the plurality of nodes over the period of time and the second time series data indicate changes in the state of the plurality of edges over the period of time; and
    generating a graphical representation of an operational state of the system at a historical time instance within the period of time in response to a query of the first time series and the second time series data of the FHDN.

2. The method of claim 1, wherein the graphical representation of the operational state of the system comprises an exact graphical representation of the state of the system, in an as-operated state, at the historical time instance.

3. The method of claim 1, wherein the graphical representation of an operational state of the system comprises an exact graphical state for a subset of the system at the historical time instance.

4. The method of claim 1, further comprising determining a historical dynamic behavior of the FHDN based on the first time series and the second time series data without analyzing a sequence of snapshots of the system captured at different points in time.

5. The method of claim 1, further comprising searching, based on the query of the FHDN for the historical time instance, a subset of the first time series, a subset of the second time series data, or a subset of both the first time series and the second time series data, wherein the FHDN permits the query for the historical time instance to be answered without requiring full system instantiation at said historical time instance.

6. The method of claim 1, wherein the plurality of nodes and edges of the graph comprises (1) all nodes and edges that previously existed but no longer exist in the system, and (2) all nodes and edges that presently exist in the system.

7. The method of claim 1, wherein the first time series for a selected node comprises times of additions or removals of the selected node in the system, wherein the second time series data for a selected edge comprises times of additions or removals of the selected edge in the-system.

8. The method of claim 1, wherein the first time series are based on events or changes occurring at a selected node, and wherein the second time series data are based on events or changes occurring at a selected edge.

9. The method of claim 1, wherein the state of the system at the historical time instance is obtained by using the query and a search algorithm that iterates over the plurality of nodes and searches through the first time series and the second time series data.

10. The method of claim 9, wherein the search algorithm comprises an iterative graph search algorithm that is configured to only check a status of selected nodes or edges on an as-needed basis.

11. The method of claim 9, wherein the query comprises an information request about a subset of nodes at a given time instance, and wherein the search algorithm is configured to query the subset of nodes only and directly, without querying nodes outside the subset of nodes.

12. The method of claim 1, further comprising utilizing a blocking technique to cache entire connected graphical regions of the FHDN in memory for any given instance in time.

13. The method of claim 12, wherein the connected graphical regions of the FHDN contain no unreachable nodes.

14. The method of claim 12, wherein the blocking technique comprises standard blocking, token blocking, or attribute-clustering blocking.

15. The method of claim 13, wherein the caching of the entire connected graphical regions in memory allows searches to be carried out more quickly compared to conventional network graphing techniques.

16. The method of claim 1, wherein the use of the FHDN allows memory/storage savings of at least three orders of magnitude compared to conventional network graphing techniques.

17. The method of claim 1, wherein the FHDN is stored in a two-dimensional matrix comprising a plurality of rows and columns, wherein each row of the plurality of rows represents one of the plurality of nodes, wherein each column of the plurality of columns represents one of the plurality of edges, and wherein an entry at a row and a column in the two-dimensional matrix indicates whether the edge represented by the column is connected to the node represented by the row.

18. The method of claim 17, wherein the entry is a portion of the first time series, the second time series data, or both.

19. The method of claim 1, wherein the FHDN is stored in a graph database.

20. The method of claim 19, wherein the graph database comprises a plurality of pointers between the plurality of nodes, wherein each pointer represents one of the plurality of edges.

21. The method of claim 20, wherein the plurality of pointers comprises a pointer that is bidirectional.

22. The method of claim 20, wherein the plurality of pointers comprises a pointer that is unidirectional.

23. The method of claim 1, wherein the plurality of nodes and the plurality of edges comprise tags or properties.

24. The method of claim 1, wherein the plurality of edges comprises weights that indicate strength of connections or relationships between nodes.

25. The method of claim 1, wherein the system comprises a Bill of Materials for a manufacturing company.

26. The method of claim 1, wherein the FHDN is constructed without requiring periodic capturing and storing of snapshots of the system at different points in time.

27. The method of claim 1, wherein constructing the FHDN of the system comprises generating data objects that represent the plurality of nodes, the plurality of edges, the first time series, and the second time series data.

28. A system for determining a historical state of a system, the system comprising:
  a data aggregation component for continuously obtaining data about a system from a plurality of different data sources over a period of time; and
  a network graphing component configured to:
    construct a full history dynamic network (FHDN) of the system using the data, wherein the FHDN comprises a graph representing the system over the period of time, wherein the graph comprises:
      (1) a plurality of nodes that represent elements of the system during the period of time, wherein the plurality of nodes are capable of dynamically changing over the period of time;
      (2) a plurality of edges connecting the nodes, wherein each edge of the plurality of edges represents a relationship between a pair of nodes over the period of time, and wherein the plurality of edges are capable of dynamically changing over the period of time;
      (3) first time series associated with each of the plurality of nodes; and
      (4) second time series associated with each of the plurality of edges,
      wherein the first time series indicate changes in a state of the plurality of nodes over the period of time and the second time series indicate changes in a state of the plurality of edges over the period of time, and wherein the FHDN is constructed without requiring periodic capturing and storing of snapshots of the system at different points in time; and
    generate a graphical representation of an operational state of the system at a historical time instance within the period of time in response to a query of the FHDN.

* * * * *